(12) United States Patent
Srivastava et al.

(10) Patent No.: US 7,307,629 B2
(45) Date of Patent: Dec. 11, 2007

(54) GENERATION OF THREE DIMENSIONAL FRACTAL SUBSURFACE STRUCTURE BY VORONOI TESSELLATION AND COMPUTATION OF GRAVITY RESPONSE OF SUCH FRACTAL STRUCTURE

(75) Inventors: Ravi Srivastava, Andhra Pradesh (IN); V. Dimri, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 138 days.

(21) Appl. No.: 10/813,649

(22) Filed: Mar. 31, 2004

(65) Prior Publication Data

US 2004/0201585 A1 Oct. 14, 2004

(51) Int. Cl.
*G06T 17/20* (2006.01)
*G06T 17/00* (2006.01)
(52) U.S. Cl. ...................... 345/423; 345/419
(58) Field of Classification Search ............ None
See application file for complete search history.

(56) References Cited

OTHER PUBLICATIONS

Ledru et al., "GeoFrance3D: an integrated approach to 3D geological and geophysical imaging of the subsurface", www.brgm.fr/geofrance3d/presentation/presentation_principal.html, Copyright 2001 GeoFrance3D BRGM.*
Ken Shirriff, "Generating Fractals from Voronoi Diagrams", Comp Sci Division, Univ of California, Berkeley, Aug. 23, 1995.*
E. J. Sides, "Geological modelling of mineral deposits for prediction in mining", Springer-Verlag 1997, Inter Institute for Aerospace Survey and Earth Sciences, The Netherlands.*
Iiya D. Mishev, "Finite Volume Methods on Voronoi Meshes", Dept of Mathematics, Duke University, 1998.*
Archibald et al., "Multiscale edge analysis of potential field data", 1998, Exploration Geophysics, pp. 30, 38-44.*
Bott, M.H.P., The Use of Rapid Digital Computing Methods for Direct Gravity Interpretation of Sedimentary Basins, Geophysical Journal of the Royal Astronomical Society; 1959; pp. 63-67.

(Continued)

*Primary Examiner*—Kee M. Tung
*Assistant Examiner*—Daniel F Hajnik
(74) *Attorney, Agent, or Firm*—Nixon & Vanderhye P.C.

(57) ABSTRACT

Domain characterization generated by Voronoi tessellation, which is very close to realistic geology and computation of gravity response of such domain, has a three dimensional fractal basin structure, and is favorable for oil exploration. Interfaces or tessellating domains are represented by a set of parameters, which are referred as Voronoi centers. These parameters can be perturbed by any amount without getting into representational problems. To accomplish such representation Voronoi tessellation is used, which in two dimensional space involves enclosing every Voronoi center by a Voronoi polygon such that the common edge of adjacent polygons is a perpendicular bisector to the line joining the Voronoi centers on both the sides of that edge. Instead of using conventional Euclidian distances, the notion of Voronoi tessellation is generalized by using $L^p$ distances, where p can hold any real value so that Voronoi domains are not necessarily polygonal. A desired fractal subsurface is generated using this approach that is quite close to the natural settings. Next, the gravity response due to this fractal subsurface structure is computed. A significant advantage is provided especially in geophysical inversion where initial model parameters are updated in each iteration, which can be done more easily and efficiently by Voronoi tessellation merely by changing Voronoi centers.

4 Claims, 7 Drawing Sheets

OTHER PUBLICATIONS

Dimri, V.P., Deconvolution and Inverse Theory, Methods in Geochemistry and Geophysics, 29, Elsevier Science Publishers, Amsterdam, The Netherlands; 1992, pp. 70-75.

Dimri, V.P., Fractal Dimension Analysis of Soil Fro Flow Studies, National Geophysical Research Institute, Hyderabad, 500 007, India, circa 2000, pp. 189-193.

Mandelbrot, B.B., The Fractal Geometry of Nature, W.H. Freeman, New York, circa 1980.

Maus, S. et al, Potential Field Power Spectrum Inversion for Scaling Geology, Journal of Geophysical research, vol. 100, No. B7, pp. 12,605-12,616, Jul. 10, 1995.

Moharir, P.S., et al., Lemniscates Representation for Inversion of Gravity and Magnetic Data Through Nonlocal Optimization, Proc. Indian Acad. Sci(Earch Planet, Sci.), 108, No. 4, Dec. 1999, pp. 233-231.

Talwani, M. et al., Rapid Gravity Computations for Two-Dimensional Bodies with Application to the Mendocino Submarine Fracture Zone, Journal of Geophysical Research, Vo. 64; Jan. 1959, pp. 49-59.

Talwani, M. et al., Rapid Computation of Gravitational Attraction of Three-Dimensional Bodies of Arbitrary Shape, GEOPHYSICS, Vo. 64, Feb. 1960, pp. 203-225.

Tipper, A Straight Forward Iterative Algorithm for the Planar Voronoi Diagram, Information Processing Letters, 34, pp. 155-160, 1990.

Ledru, GeoFrance 3D: An Integrated Approach to 3D Geological Imaging of the Subsurface, http://www.brgm.fr/geofrance3d/presentation/presentation_principal.html, pp. 1-13, Jan. 28, 2006.

Shirriff, Generating Fractals from Voronoi Diagrams, Aug. 23, 2995.

Sides, "Geological Modelling of Mineral Deposits for Prediction in Mining", Geo Rundsch (1997) 86:342-353, Springer-Verlag 1997.

Misheve, "Finite VolumeMethods on Voronoi Meshes", Depart. Of Mathematics, Duke University, Durham, NC 27708-0320, Received Feb. 20, 2997; accepted Aug. 11, 1997.

Archibald et al., "Multiscale Edge Analysis of Potential Field Data", pp. 1-24, http:///www.per.marine.csiro.au/staff/Fabio.Boschetti/full_pap_list.html, Jan. 29, 2006.

* cited by examiner

GENERATION OF THREE DIMENSIONAL FRACTAL SUBSURFACE STRUCTURE BY VORONOI TESSELLATION AND COMPUTATION OF GRAVITY RESPONSE OF SUCH FRACTAL STRUCTURE

FIELD OF THE INVENTION

The present invention relates to a method for the generation of three dimensional fractal subsurface structures by Voronoi Tessellation and computation of the gravity response of such fractal structures. The present invention has a wide range of applications in practically all geophysical exploration programs. The method provides a sub-surface basin structure; which is very close to the natural setting and hence can be very useful for modeling of hydrocarbon reservoirs and mineral deposits for optimum estimation and simulation of the reserve having known precisely the extent and shape of the anomalous region by the method, which uses a fractal approach. The fractal structure, being very irregular conforms to natural geological situations, which have been utilized to demonstrate its applicability in various geophysical exploration programs.

BACKGROUND OF THE INVENTION

The present exemplary embodiment of the invention provides a new approach for generation of three dimensional fractal subsurface structures by Voronoi tessellation and computation of the gravity response of such fractal structure. This provides an efficient and new way of fractal subsurface generation, which removes possibilities of getting into a reentrant structure while perturbing Voronoi centers during iteration steps (involving in inverse modeling of the underlying structure and computation of the gravity response of such fractal subsurface, which constitutes forward modeling of the underlying structure for exploration of hydrocarbons and minerals).

It is known from gravitational law that bodies having mass exert attractional force on each other. In geophysical aspects instead of mass, the density plays a direct role in gravity surveys since density varies laterally as well as vertically, and hence affects the mass of a volume. It could be posed in a way that if a large object is having density contrast with its surroundings then it will reflect its signature in the observed gravity field. In case of geophysical studies the density contrast between different interfaces is responsible for the gravity anomaly, which in turn can be studied either for hydrocarbon exploration or for geological studies.

Exploration for hydrocarbons and minerals in subsurface environments with anomalous density variations have always been problems for traditional seismic imaging techniques by concealing geological structures beneath zones of anomalous density. Many methods for delineating the extent of the highly anomalous density zones exist. Exploration for hydrocarbons in subsurface environments with anomalous density variations such as salt formations, shale diapers create difficulties in seismic imaging techniques by concealing geologic structures beneath zones of anomalous density. By utilizing gravity, magnetic measurements and geological constraints along with a robust inversion process, these anomalous density zones can be modeled. The spatial resolution obtained from this process is normally much lower than that obtained from reflection seismic data. However, models obtained from gravity and magnetic data can provide a more accurate starting model for the seismic processing. Using the potential field data models as a starting model for two dimensional and three dimensional imaging by any technique greatly enhances the probability of mapping these concealed geologic structures beneath the zones of anomalous density. One source of geologic exploration data that has not been used extensively in spite of being cheapest in the past is potential fields data, such as gravity and magnetic data, and using potential fields data in combination with seismic data to provide a more accurate depth model which is a key parameter in any exploration program.

In a paper in Geophysical Journal of Royal Astronomical Society, v.3, 1960, Bott suggested a method to trace the floor of a sedimentary basin, which involved the approximation of a sedimentary basin by a series of two dimensional juxtaposed rectangular/square blocks of uniform density. The assumption of uniform density in entire rectangular/square blocks in said method is highly simplified case of actual reality. Computation of gravity anomalies due to two dimensional and three dimensional bodies of arbitrary shape has been given in Journal of Geophysical Research, v.64, 1959 by Talwani et al. and in Geophysics, v.25, 1960 by Talwani and Ewing which uses several variables in terms of co-ordinates of the corners of the polygons. The method is as accurate as much the number of corners is assumed to approximate the irregular shaped body, which enhances number of variables to be used in computation. The problem becomes much more complicated and cumbersome to deal with so many parameters when the said method is used in an inversion algorithm wherein the co-ordinates of the polygon corners are perturbed in every iteration in order to fit and achieve the best model. Yet another problem in said method arises when used in automated inversion algorithm is that of getting into a reentrant structure while perturbation of the polygon corner co-ordinates. This method became very popular and is widely used even in present days because of its mathematical simplicity. All these theories mentioned above, assumed subsurface structure consisting of some simple geometrical shape but Dimri opined the concept of fractal subsurface structure in chapter 16 "Fractal dimension analysis of soil for flow studies" pp. 189-193 In: Application of fractals in earth sciences, 2000, edited, V. P. Dimri, A. A. Balkema, USA. Benoit Mandelbrot, who coined the term fractal in his book "The fractal geometry of nature", W. H. Freeman, New York, 1982 are put forth as the fractals are generally irregular (not smooth) in shape, and thus are not objects definable by traditional geometry. That means fractals tend to have significant detail, visible at any arbitrary scale; when there is self-similarity, this can occur because zooming in simply shows similar pictures, alternatively "A geometrical or physical structure having an irregular or fragmented shape at all scales of measurement" is known as fractal structure. Earlier in the Journal of Geophysical Research v. 100, 1995 Maus and Dimri had opined new concept of scaling behavior of potential fields and established a relation between the scaling exponent of source and field, which is useful for understanding of fractal geology. The fractal structure can be generated using very few parameters by Voronoi tessellation.

In a straight forward iterative algorithm for the planar Voronoi diagram, Information Process Letters, v. 34, 1990, Tipper illustrated that the Voronoi tessellation in a two dimensional space consists of enclosing every center by a Voronoi polygon (FIG. 1) such that common edge of adjacent polygons is perpendicular bisector to the line joining the centers on each side of that edge. Tipper illustrated Voronoi tessellation which uses least square distance formula i.e. $L^2$ norm which limits the possibility and hence efficiency of generating variety of structures merely by changing the exponent p in the $L^p$ norm. Here we have generalised the notion of Voronoi tessellation by using $L^p$ distances instead of the least square distances as mentioned in 'Deconvolution and Inverse Theory: Application to Geophysical Problems', Elsevier Publication, 1992, by Dimri, V. P., so that Voronoi domains are not necessarily of polygonal shape (FIG. 2(b)).

In yet another study published in proceeding of Indian Academy of Sciences (Earth and Planetary Sciences) v. 108, 1999, Moharir et al. have advocated the use of economical sub-surface representational techniques for non-local optimization, wherein authors have used leminiscate representation which does not provide such an efficient and wider possibility of generating subsurface structure as given in the present invention. In the present invention a fractal sub-surface is generated which is close to the natural settings and domains of different physical property are assigned different colors, which can be later perturbed iteratively for inverse modeling, which is important in the interpretation of geophysical data as mentioned in the book by Dimri, V. P., 1992, Elsevier Science Publisher, Amsterdam.

There is a need for a method for efficient and accurate delineation of subsurface structure which is close to the real geology present below the earth surface in two dimensions and three dimensions. Such a method should preferably be able to use physical property variations in the subsurface geometry. Also, the method should preferably be able to obtain a realistic forward model of anomalous formations that are expected in a normal sedimentary basin, which can be used in exploration. The present invention satisfies this need.

OBJECTS OF THE INVENTION

A main aspect of the invention is to provide a method for the generation of three dimensional fractal subsurface structures by Voronoi Tessellation and computation of a gravity response of such fractal structure, which obviates drawbacks as detailed above.

Another aspect of the present invention is to provide an efficient method for generation of a fractal subsurface which is very close to real geological situations.

Yet another aspect of the present invention has direct implication in reservoir modeling by generating complex geological situations wherein the variation of physical properties can be very well studied and predicted using a fractal approach.

Yet another aspect of the present invention is to provide applications which can be used in any branch of geophysical exploration.

SUMMARY OF THE INVENTION

A method is provided for the generation of three dimensional fractal subsurface structures by Voronoi tessellation and computation of a gravity response of such fractal structure. This provides a robust and efficient process for generation of fractal subsurface structures, which is very close to a natural setting of the subsurface geology and which provides computation of forward gravity responses of such structures for delineation of an underlying anomalous object.

In an embodiment of the present invention Voronoi centers may be selected and the region of interest may be tessellated around those centers to provide a geologic subsurface earth model with physical property variation viz. density in case of gravity prospecting.

In another embodiment of the present invention the gravity response due to said geological subsurface earth model is computed, which can be introduced into the inversion process to further refine the model or as is done in forward modeling, the model may be changed by perturbing Voronoi centers and again gravity response may be computed to match the observed gravity anomaly. This process of inversion/forward modeling is repeated until the results converge to a single answer.

In yet another embodiment of the present invention the method is used to provide an excellent technique which has its application in various geophysical methods other than gravity e.g. seismic for the precise mapping of reservoir geometry which intern shall help in demarcating reservoir boundary, physical property variations and as a whole in enhancing oil recovery from an existing oil reservoir.

BRIEF DESCRIPTION OF THE ACCOMPANYING DRAWINGS

FIGS. 1(a) and (b) represent the fundamental of existing Voronoi tessellation wherein circles 10 are drawn with increasing radius about the Voronoi centers 12 and a tangent line 14 is drawn where the adjacent circles touches each other. FIG. 1(b) shows the particular case of generating a layered model.

FIG. 2(a) represents a general case where a polygonal structure is generated using 15 Voronoi centers 16 using existing Voronoi tessellation. FIG. 2(b) represents a subsurface generated by modified Voronoi tessellation (defined by dotted lines) using four Voronoi centers (shown as bolded black stars).

FIG. 3 represents a 3-D subsurface structure wherein 2-D layers of variable physical property regions are overlain to generate 3-D volume. 2-D layers are shown separate for the sake of clarity of physical property variations shown in each layer. The figure demonstrates the ability for generating various kind of structures shown in different layers merely by changing exponent p in $L^p$ norm, keeping Voronoi centers fixed.

Figure 6A:
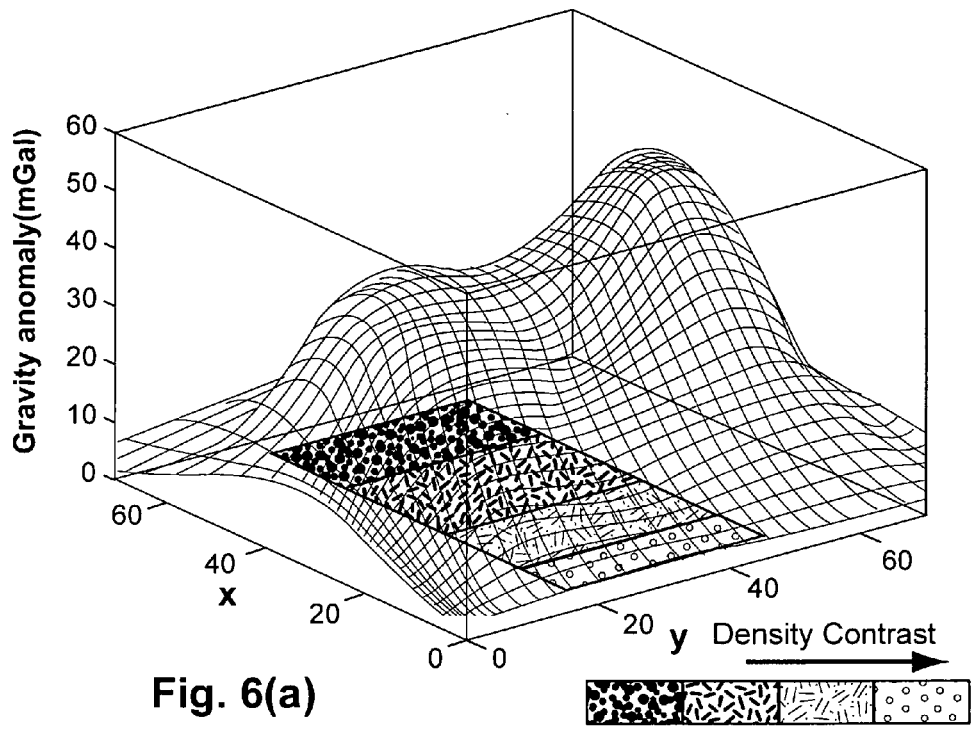
Figure 6B:
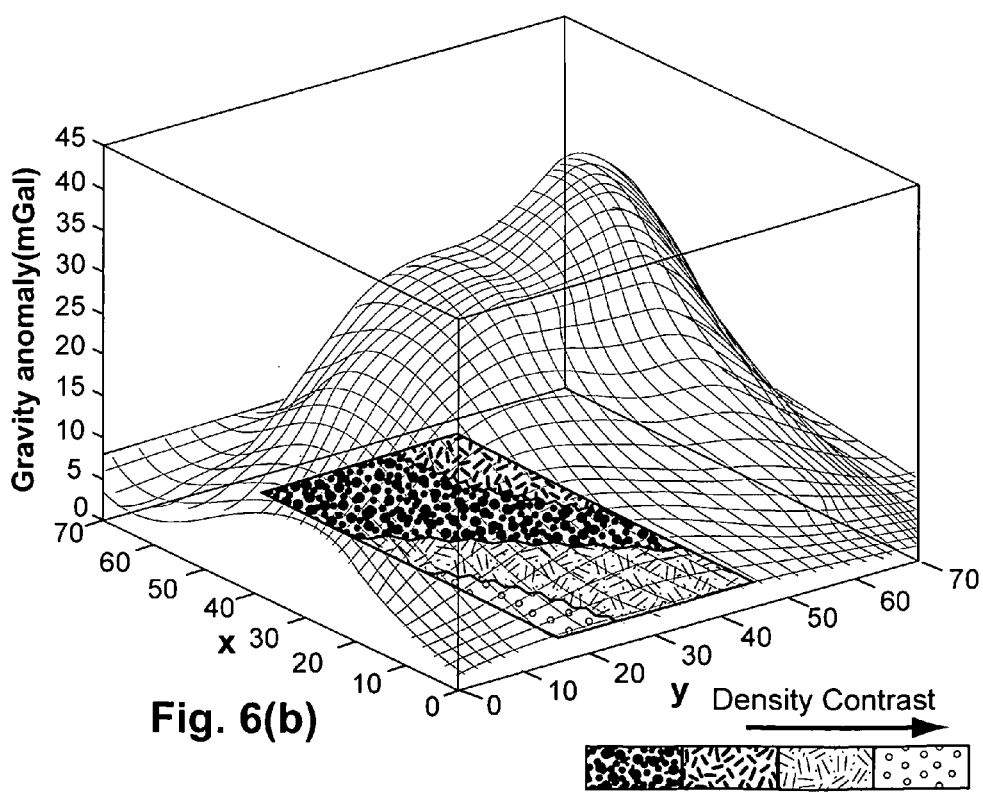

FIG. 6(a) represents an example of a gravity anomaly response over the simplified horizontal layered model. FIG. 6(b) represents an example of gravity response calculated over a fractal subsurface structure showing four regions of different physical property (density) variations. Density values assigned to differently shaded areas are 2.1, 2.3, 2.67 and 2.5 g/cc respectively, and the depth at which fractal subsurface is assumed is 10 units.

Figure 7:
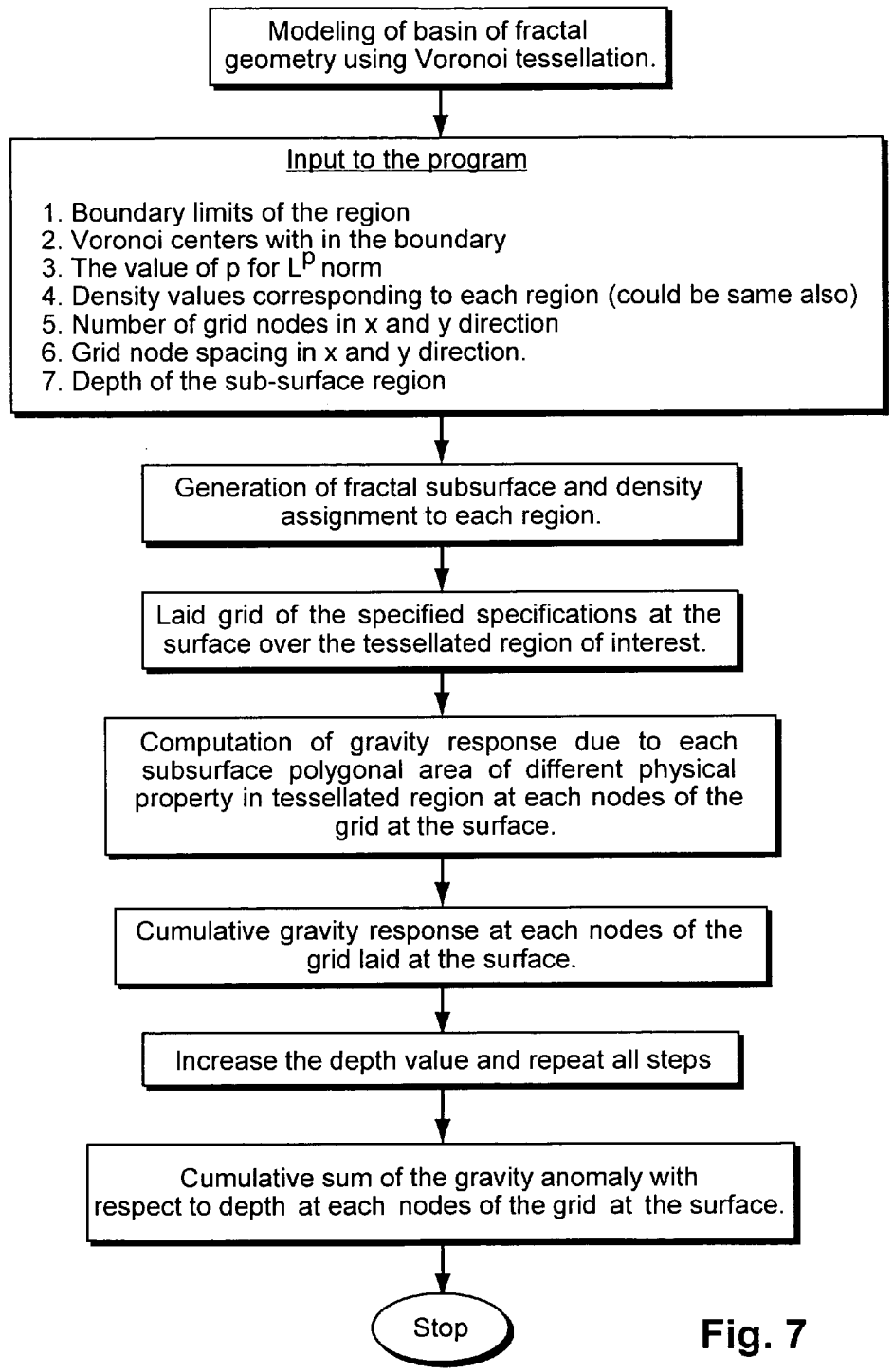

FIG. 7 represents a flow chart of the procedure adopted for the computation of a gravity response over a fractal subsurface.

DETAILED DESCRIPTION OF EXEMPLARY EMBODIMENTS OF INVENTION

The present exemplary embodiment brings a new facet of domain characterization using a set of parameters, referred herein as Voronoi centers. These parameters are perturbed and thus the different tessellated regions are generated at different depths. This characterization is very suitable and entails the development for solution of geophysical inverse problems with the help of non-local optimization techniques.

Figure 2A:
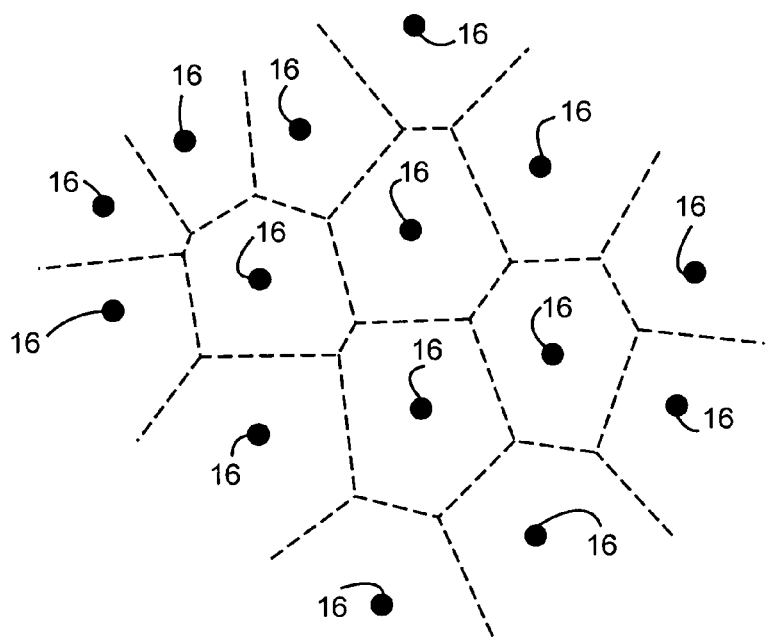

Given a set of points $q_1, q_2, \ldots q_n$ in $R^n$ (FIG. 2(a), points are shown as red dots), the Voronoi Region $V_i$ of a particular vector $q_i$ is defined as the set of all points in $R^n$ for which $q_i$ is the nearest vector:

$$V_i = \{x \in R^n | i = \arg\min_{j \in \{1, \ldots, N\}} \|x - q_j\|\},$$

where $R^n$ is set of real numbers, $q_i$ are the points inside the Voronoi region $V_i$, x is any point within $V_i \subset R^n$, N is any integer.

Figure 1A:
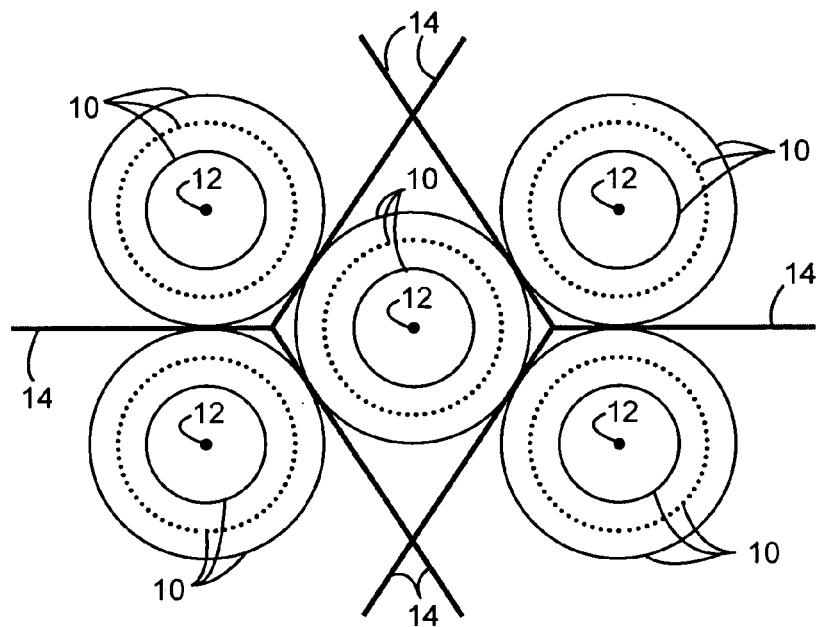
Figure 1B:
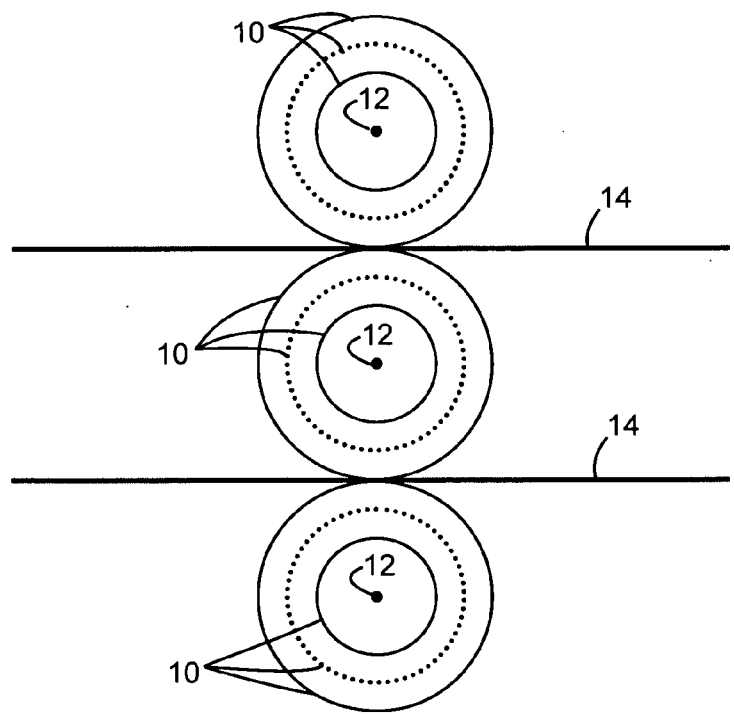
Figure 5:
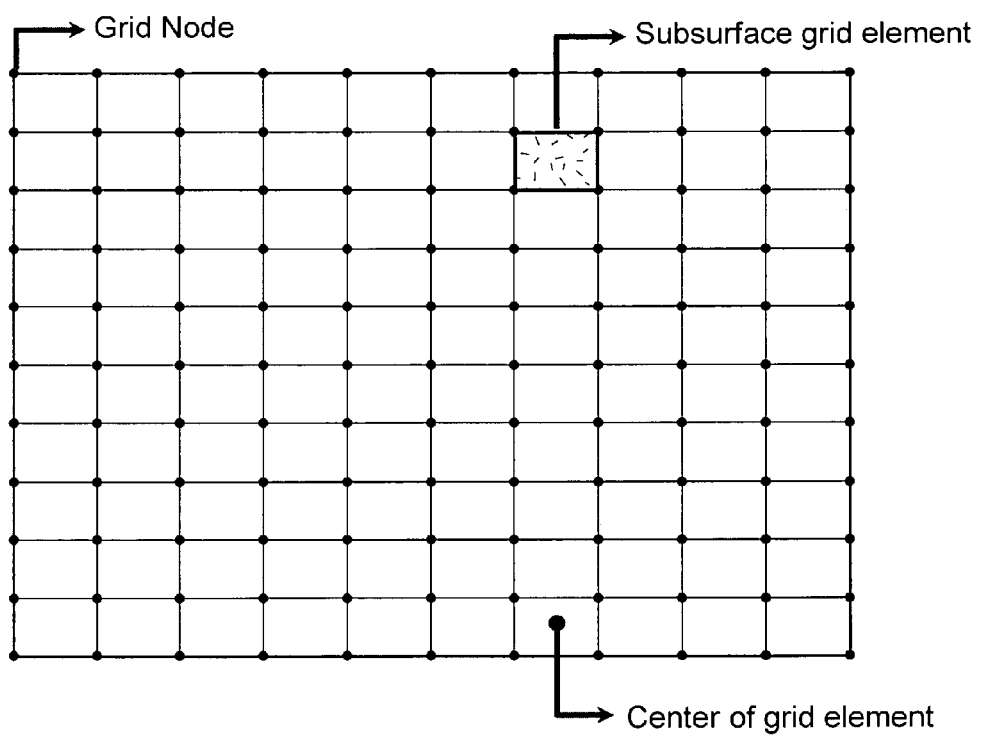
FIG. 5 represents a grid overlain on a region of interest.

In a straight forward iterative algorithm for the planar Voronoi diagram, Information Process Letters, v. 34, 1990, Tipper illustrated that the Voronoi tessellation in a two dimensional space consists of enclosing every center by a Voronoi polygon (FIG. 1) such that common edge of adjacent polygons is perpendicular bisector to the line joining the centers on each side of that edge. Here we have generalised the notion of Voronoi tessellation by using $L^p$ distances instead of the least square distances so that Voronoi domains are not necessarily of polygonal shape (FIG. 2(b)). The $L^p$ distance is given by the expression: $L^p = (x - q_j)^{1/p}$, where x is an arbitrary point and $q_j$ is a point whose distance has to be calculated, and p is an exponent which can hold any real value. Initially a few Voronoi centers are taken and from them two dimensional Voronoi tessellation is generated in which different domains are shown by different colours (FIG. 2(b)). Density contrast corresponding to each domains of the tessellated region is assigned while its generation by Voronoi tessellation. A grid is laid over the tessellated region on the surface and gravity anomaly is calculated at each grid node (FIG. 5). The gravity response due to each subsurface region of different physical property (shown by different colors in FIG. 2(b)) is calculated at each node of the grid laid at the surface. Next the cumulative response of each subsurface region of different layers (FIG. 3) is computed at each nodes of the grid laid at the surface. If tessellated regions are at equal depths then the integrated response can be calculated by Simpson's rule other wise Gauss's quadrature formula can be used for tessellated regions at unequal depths. The gravity anomaly at each nodes of the grid laid at surface is computed due to subsurface tessellated region at depth Z=10 unit as an example shown in FIG. 6.

Mathematical Expressions for the Computation of Gravity Anomaly

The gravity anomaly caused by the polygonal lamina per unit thickness, in a form suitable for programming is expressed in terms of $x_i, y_i, z$ and $x_{i+1}, y_{i+1}, z$, the co-ordinates of two successive vertices of the polygon and has been given in Geophysics, v. 25, 1960, by Talwani and Ewing as:

$$V = G\rho \sum_{i=1}^{n} \left[W \arccos\{(x_i/r_i)(x_{i+1}/r_{i+1}) + (y_i/r_i)(y_{i+1}/r_{i+1})\} - \arcsin\frac{zq_i S}{(p_i^2 + z_i^2)^{1/2}} + \arcsin\frac{zf_i S}{(p_i^2 + z_i^2)^{1/2}}\right]$$

Where S=+1 if $p_i$ is positive, S=−1 if $p_i$ is negative,
W=+1 if $m_i$ is positive, W=−1 if $m_i$ is negative,
'Z' is depth and 'n' is number of sides in the polygon.
G is universal gravitational constant, ρ is the density of the tessellated regions (shown in different colours in FIG. 2(b)).

$$p_i = \frac{y_i - y_{i+1}}{r_{i,i+1}} x_i - \frac{x_i - x_{i+1}}{r_{i,i+1}} y_i,$$

$$q_i = \frac{x_i - x_{i+1}}{r_{i,i+1}} \frac{x_i}{r_i} + \frac{y_i - y_{i+1}}{r_{i,i+1}} \frac{y_i}{r_i},$$

$$f_i = \frac{x_i - x_{i+1}}{r_{i,i+1}} \frac{x_{i+1}}{r_{i+1}} + \frac{y_i - y_{i+1}}{r_{i,i+1}} \frac{y_{i+1}}{r_{i+1}},$$

$$m_i = \frac{x_{i+1}}{r_{i+1}} \frac{y_i}{r_i} - \frac{y_{i+1}}{r_{i+1}} \frac{x_i}{r_i},$$

$$r_i = +(x_i^2 + y_i^2)^{1/2},$$

$$r_{i+1} = +(x_{i+1}^2 + y_{i+1}^2)^{1/2},$$

$$r_{i,i+1} = +[(x_i - x_{i+1})^2 + (y_i - y_{i+1})^2]^{1/2}.$$

In the application of this algorithm the effect of common arm adjacent to the polygonal tessellated region is removed as it contributes twice for the response in gravity anomaly computation. The stepwise implementation of the algorithm is shown in FIG. 7 as a flowchart.

The present invention has its novelty over previous work in following counts:

The method uses fractal subsurface structure which represents complex geological structures. Simple polygonal structures were used because of mathematical simplicity and such realistic structures were avoided hitherto.

The method uses physical property variation in lateral and vertical direction; provides the solution more closure to reality because none of the things in general are found homogenous beneath the earth as has been assumed in previous literature.

Figure 4:
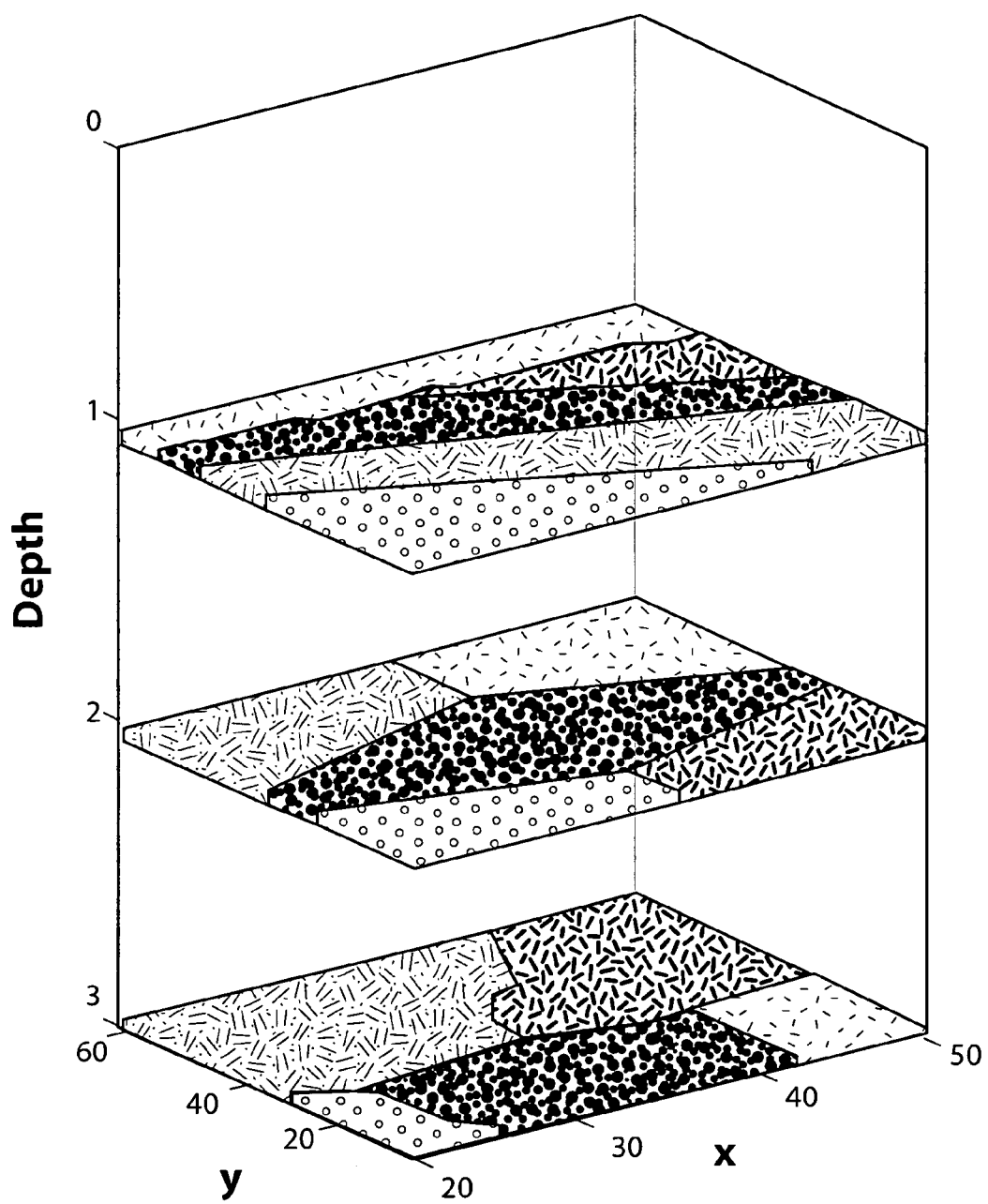
FIG. 4 represents a 3-D structure wherein layers of different physical property variations are shown. The figure demonstrates another possibility for various structures as shown in different layers by changing Voronoi centers keeping exponent p constant in $L^p$ norm.

The method is very efficient as it involves very few Voronoi centers to change the geometry or even keeping the Voronoi centers constant we are able to achieve various combinations of the complex structures merely by changing the exponent p in $L^p$ norm used in Voronoi tessellation (FIG. 4). This is in contrast to the previous work where simple polygonal geometry was used and to represent polygons one has to deal with as many parameters as the number of corners in the polygons.

The present method is useful for delineation of complex subsurface structures, which are generally favourable for oil accumulation. The previous work done in this line may not be as accurate and efficient as the present work because of the simple geometry used for the modeling of the underlying objects.

The following examples are given by way of illustration and therefore should not be construed to limit the scope of the present invention.

EXAMPLE 1

A fractal subsurface is generated using $L^p$ norm taking p=1.5, wherein the Voronoi region is defined by the co-ordinates x=20 to 45 and y=25 to 50. The Voronoi centers chosen within this region are given by the following co-ordinates:

| x | y |
|---|---|
| 22.6 | 28.75 |
| 30.6 | 30.6 |

-continued

| x | y |
|---|---|
| 36.6 | 36.6 |
| 41.4 | 41.4 |

Figure 2B:
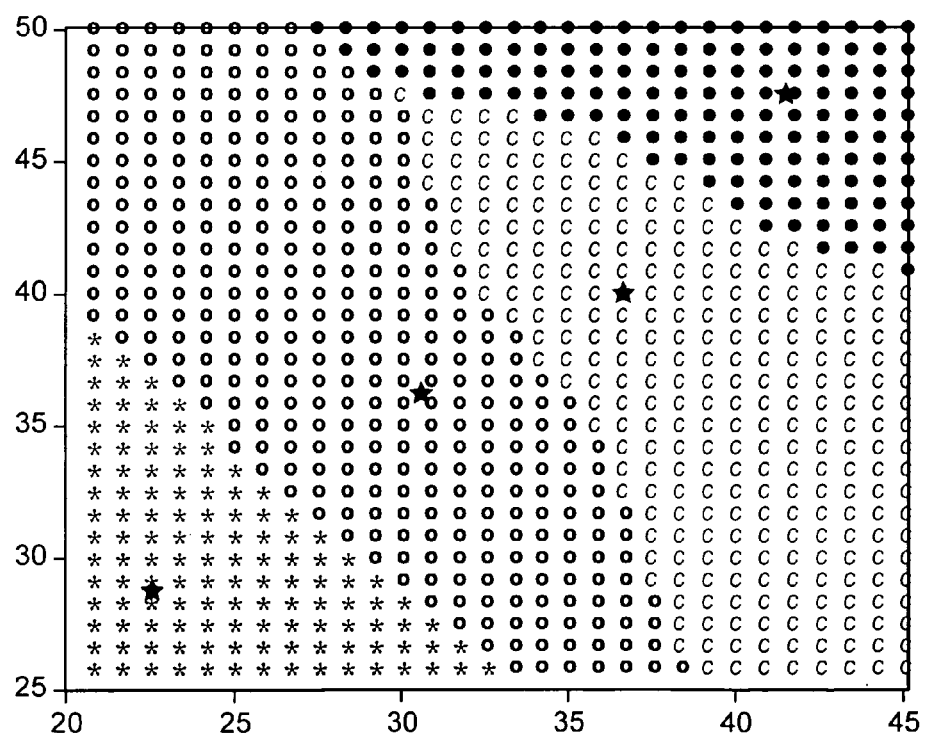

The subsurface thus generated is shown in FIG. 2(b), with Voronoi centers marked as black dots.

EXAMPLE 2

In yet another example the fractal subsurface at different depth levels are generated using different $L^p$ norms. The co-ordinates of Vornoi region for all the subsurfaces were taken as x=20 to 50 and y=5 to 65 and Voronoi centers within the region were taken as:

| x | y |
|---|---|
| 22.0 | 26.0 |
| 30.0 | 33.0 |
| 37.0 | 40.0 |
| 46.0 | 48.0 |
| 48.0 | 58.0 |

Figure 3:
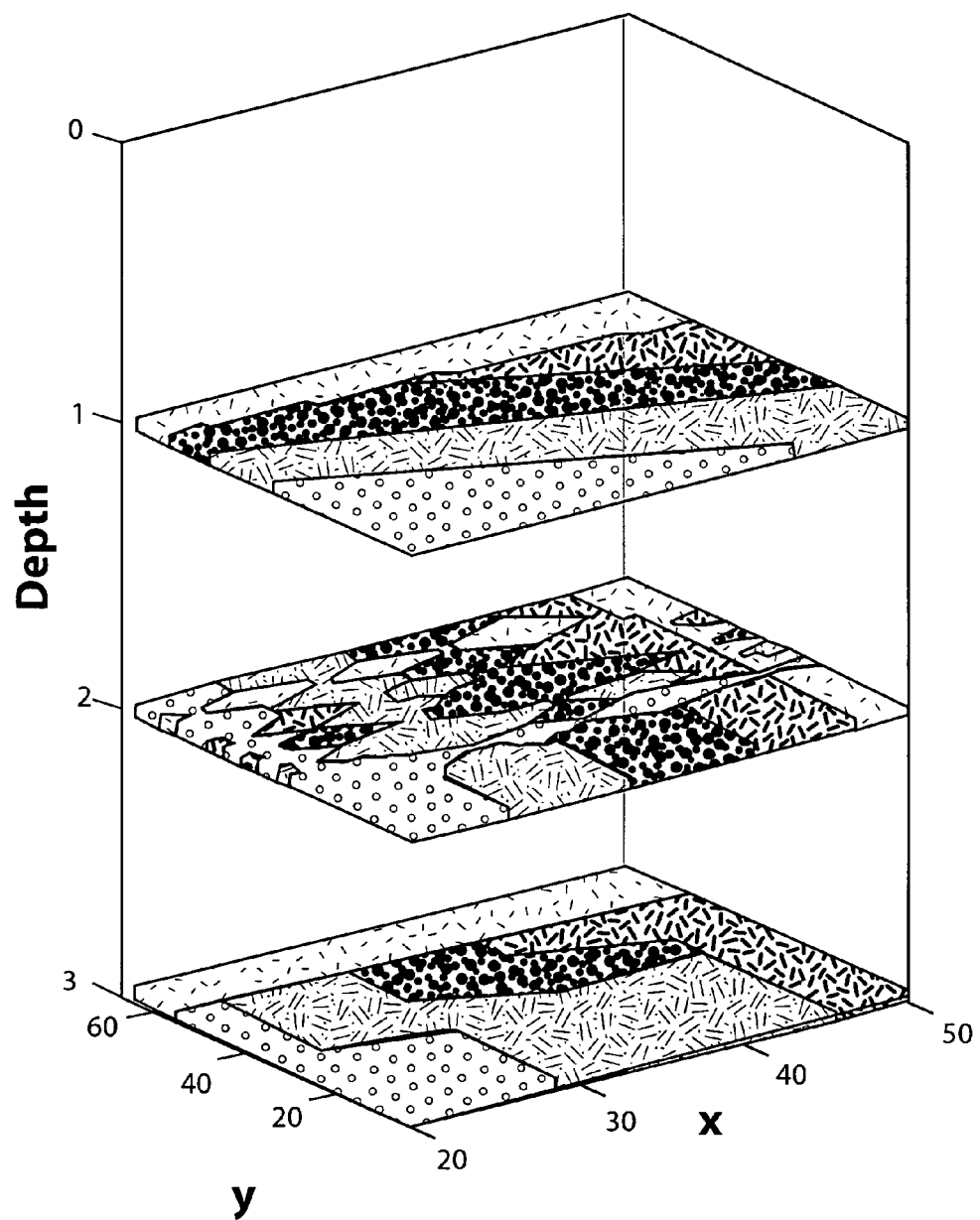

This example shows the variation in geometry and provides and excellent way of changing the geometry merely by changing the exponent p in $L^p$ norm. The results are shown in FIG. 3 where the first layer (topmost) corresponds to p=1.5, the middle layer corresponds to p=−1.5 and the lowermost corresponds to p=1.0, which is equivalent to $L^1$ norm.

EXAMPLE 3

In yet another example as shown in FIG. 4 the fractal subsurface at different depth levels are generated using same $L^p$ norm, where p=1.5 but Voronoi centers are changed. This example illustrates the possibilities of generating different kind of structures by changing Voronoi centers. The co-ordinates of Vornoi region for all the subsurfaces were taken as x=20 to 50 and y=5 to 65 and 5 Voronoi centers within the Voronoi region were taken having following x,y co-ordinates:

| Top layer | | Middle Layer | | Bottom Layer | |
|---|---|---|---|---|---|
| x1 | y1 | x2 | x2 | x3 | y3 |
| 22.0 | 26.0 | 22.0 | 7.0 | 15.0 | 8.0 |
| 30.0 | 33.0 | 22.0 | 50.0 | 30.0 | 50.0 |
| 37.0 | 40.0 | 35.0 | 33.0 | 35.0 | 10.0 |
| 46.0 | 48.0 | 50.0 | 7.0 | 45.0 | 45.0 |
| 48.0 | 58.0 | 50.0 | 50.0 | 55.0 | 10.0 |

EXAMPLE 4

In yet another example the gravity anomaly computed over the fractal subsurface is shown in FIG. 6. FIG. 6(a) corresponds to the particular case wherein Voronoi centers are taken along a line which gives layered model where as FIG. 6(b) represents the fractal structure where Voronoi centers correspond to those given in EXAMPLE 1. The density values corresponding to red, blue, green and magenta colors are 2.1, 2.3, 2.67 and 2.5 respectively. The fractal subsurface is assumed at the depth of 10 unit from the surface.

The Main Advantages of the Invention Are:

1. To provide a new approach for generation of three dimensional fractal subsurface structure by Voronoi tessellation and computation of gravity response of such fractal structure, this is an efficient way of fractal subsurface generation and computation of gravity response of the same. This method removes all the possibilities of getting into a reentrant structure while perturbation of Voronoi centers during iteration steps involved in inverse modelling of the underlying structure. The said method constitutes delineation of the underlying structure for exploration and production of hydrocarbons and minerals lying below the earth's surface.
2. The technique of Voronoi tessellation has been modified using $L^p$ norm, where in p can assume any value from the set of rational numbers, provides wider possibilities of generating different realistic sub-surface structures. This is an innovative approach proposed herewith for delineation of complicated geologic structure which are favorable for oil accumulation and was never attempted by any one hitherto.
3. The method provides the sub-surface basin structure, which is very close to natural setting and hence can be very useful for the modeling of hydrocarbon reservoir and mineral deposits for optimum estimation and extraction of the reserve having known precisely the extent and shape of the anomalous region by the said method. This remained un-attempted in the earlier work.
4. The modified Voronoi tessellation as described herewith generates fractal subsurface merely by changing Voronoi centers in the inverse modeling process, unlike perturbation of co-ordinates of all the vertices of the geometrical structure used in all the existing modeling methods. This makes the process very efficient and fast and also provides wider possibilities of efficient modeling.
5. A new approach for generation of three dimensional fractal subsurface structure by Voronoi tessellation and computation of gravity response of such fractal structure is entirely a new invention which has got great implication in discovery of hydrocarbon and minerals.

REFERENCES

Bott, M. H. P., 1960, The use of rapid digital computing methods for direct gravity interpretation of sedimentary basins, Geophysical Journal of the Royal Astronomical Society, 3, p. 63-67.

Dimri, V. P., 1992, Deconvolution and inverse theory, application to geophysical problems, pp. 75, Elsevier science publishers, Amsterdam, the Netherlands.

Dimri, V. P., 2000, Fractal dimension analysis of soil for flow studies In: Application of fractals in earth sciences, edited, V. P. Dimri, pp. 189-193, A. A. Balkema, USA.

Mandelbrot, B. B., The fractal geometry of nature, W. H. Freeman, New York, 1983.

Maus, S. and Dimri V. P., 1995, Potential field power spectrum inversion for scaling geology, J. Geophys. Res. 100, p. 12605-12616.

Moharir, P. S., Maru V. M. and Srinivas S., 1999, Lemniscates representation for inversion of gravity and magnetic data through nonlocal optimization, Proc. Ind. Acad. Sci. (Earth & Planet. Sci.), 108, p. 223-232.

Talwani, M., Worzel, J. L., and Landisman, M., 1959, Rapid gravity computations for two-dimensional bodies with application to the Mendocino submarine fracture zone, J. Geophys. Res., 64, p. 49-59.

Talwani, M., and Maurice, E., 1960, Rapid computation of gravitational attraction of three-dimensional bodies of arbitrary shape, Geophysics, 25, p. 203-225.

Tipper, J. C., 1990, A straight forward iterative algorithm for the planar Voronoi diagram, Information Process Letters, 34, p. 155-160.

What is claimed is:

1. A method for the generation of a three dimensional fractal subsurface structure by Voronoi tessellation and computation of gravity response of such fractal structure, by generation of fractal subsurface structures and computation of a forward gravity response of such structure for delineation and modeling of an underlying anomalous object, said method comprising:

(a) selecting Voronoi centers at a plurality of locations over a region of interest, the Voronoi centers being represented by x, y, z co-ordinates;

(b) generating an initial model of a subsurface fractal geological object, having variation in a physical property in lateral and vertical directions; the initial model being generated by tessellating the Voronoi centers, and assigning values of physical property variations during generation of the model on the basis of pre-determined assumptions in the model;

(c) assigning different discernable representations to regions in the model which have different physical properties to enable demarcation;

wherein the fractal subsurface model is generated by a modified Voronoi tessellation technique which comprises modifying the Voronoi tessellation by using $L^p$ norm, where $L^p = (x-q_j)^{1/p}$, where x is an arbitrary point, $q_j$ is point whose distance has to be calculated, and p is an exponent which can assume fractional real numbers and negative real numbers thereby enabling greater range for generation of different fractal sub-surfaces, which are closer to a real geological situation, wherein the computation of a gravity response due to a fractal subsurface generated by modified Voronoi tessellation is carried out by an analytical expression which comprises:

(a) demarcating boundaries of regions having a different physical property in the tessellated region, the boundaries forming a polygonal shape in 2-dimensional space;

$$V = G\rho \sum_{i=1}^{n} \left[ W\arccos\{(x_i/r_i)(x_{i+1}/r_{i+1}) + (y_i/r_i)(y_{i+1}/r_{i+1})\} - \arcsin\frac{zq_iS}{(p_i^2 + z_i^2)^{1/2}} + \arcsin\frac{zf_iS}{(p_i^2 + z_i^2)^{1/2}} \right]$$

Where S=+1 if $p_i$ is positive, S=−1 if $p_i$ is negative,
W=+1 if $m_i$ is positive, W=−1 if $m_i$ is negative,
'Z' is depth and 'n' is number of sides in the polygon,
G is universal gravitational constant, $\rho$ is the density of the tessellated regions;

$$p_i = \frac{y_i - y_{i+1}}{r_{i,i+1}} x_i - \frac{x_i - x_{i+1}}{r_{i,i+1}} y_i,$$

$$q_i = \frac{x_i - x_{i+1}}{r_{i,i+1}} \frac{x_i}{r_i} + \frac{y_i - y_{i+1}}{r_{i,i+1}} \frac{y_i}{r_i},$$

$$f_i = \frac{x_i - x_{i+1}}{r_{i,i+1}} \frac{x_{i+1}}{r_{i+1}} + \frac{y_i - y_{i+1}}{r_{i,i+1}} \frac{y_{i+1}}{r_{i+1}},$$

$$m_i = \frac{x_{i+1}}{r_{i+1}} \frac{y_i}{r_i} - \frac{y_{i+1}}{r_{i+1}} \frac{x_i}{r_i},$$

$$r_i = +(x_i^2 + y_i^2)^{1/2},$$

$$r_{i+1} = +(x_{i+1}^2 + y_{i+1}^2)^{1/2},$$

$$r_{i,i+1} = +[(x_i - x_{i+1})^2 + (y_i - y_{i+1})^2]^{1/2}$$

$p_i$=perpendicular to a side of an irregular geometrical body from a point at which anomaly is being calculated;

$q_i=\cos(\theta_i)$ where $\theta_i$ is an angle between a side of the irregular body and line joining the first point (A) of the arm from the point at which anomaly is being computed;

$f_i=\cos(\phi_i)$, where $\phi_i$ is an angle between a side of the irregular body and line joining the end point (B) of the arm from the point at which anomaly is being computed, $m_i$=angle subtended by an arm of the irregular body at the point where anomaly is being computed;

$r_i$=distance of a point at the boundary of irregular body from the point at which anomaly is being computed;

$r_{i+1}$=distance of next consecutive point at the boundary of the irregular body from the point at which anomaly is being calculated;

$r_{i,i+1}$=length of the side of the irregular body;

i=is a subscript, which is used to select the next consecutive point on the surface of the body;

where the effect of a common arm of the adjacent polygon is removed;

(b) repeating the gravity response computation due to the polygon for all adjacent polygons of different physical properties using the demarcated polygon boundary;

(c) adopting the process of gravity response computation for tessellated regions lying at different depths to obtain a response;

(d) integrating the response using Simpson/Gauss quadrature formula at plurality of grid nodes overlain on the region of interest; and (e) creating a model of the underlying anomalous object.

2. A method as in claim 1 wherein the natural setting of the geological subsurface being modeled is selected from the group consisting of: a sedimentary basin, hydrocarbon deposits, oil reservoirs, aquifers and mineral deposits.

3. A method as claim 1 wherein results are achieved through self-written software, which generates a Voronoi tessellated subsurface region and computes a gravity response of the same.

4. A method as claim 1 which is applied to geophysical inversion, wherein the tessellated regions are altered by changing the position of Voronoi centers in each iteration.

* * * * *